United States Patent [19]
Platt

[11] 3,711,954
[45] Jan. 23, 1973

[54] COILING WIRE METERING

[76] Inventor: Stephen A. Platt, 1100 Fulton Street, Grand Haven, Mich. 49417

[22] Filed: Sept. 14, 1970

[21] Appl. No.: 71,819

[52] U.S. Cl. ................................................ 33/132
[51] Int. Cl. .......................... G01b 3/12, G01b 5/04
[58] Field of Search ........ 33/134 R, 141 R, 142, 136, 33/129, 132 R, 133

[56] References Cited

UNITED STATES PATENTS

| | | | |
|---|---|---|---|
| 1,732,635 | 10/1929 | Chabot | 33/136 X |
| 2,390,703 | 12/1945 | Garrott | 33/136 X |
| 2,695,668 | 11/1954 | Roth | 33/132 X |
| 2,747,868 | 5/1956 | Hampel | 33/132 |

FOREIGN PATENTS OR APPLICATIONS

| | | | |
|---|---|---|---|
| 46,099 | 1/1911 | Austria | 33/141 R |
| 43,853 | 12/1931 | Norway | 33/142 |

*Primary Examiner*—Leonard Forman
*Assistant Examiner*—Charles E. Phillips
*Attorney*—Price, Heneveld, Huizenga & Cooper

[57] ABSTRACT

Wire being drawn into a winding and cutting apparatus feeds around a metering wheel of the metering apparatus and thereby causes it to rotate. A belt passing over a pair of pulleys has an exposed side which engages the side of the metering wheel such that rotation of the metering wheel also drives the belt around its pulleys. The belt includes cams which engage a switching mechanism disposed adjacent one of the pulleys. The switching mechanism then activates the cutting assembly and the wire is cut in appropriate lengths. The belt and pulleys are movable as an assembly with respect to the metering wheel relocating the point of contact between the belt and the metering wheel such that the length of wire being cut can be varied.

11 Claims, 8 Drawing Figures

PATENTED JAN 23 1973 3,711,954

INVENTOR.
STEPHEN A. PLATT
BY Price, Heneveld
Huizenga & Cooper
ATTORNEYS

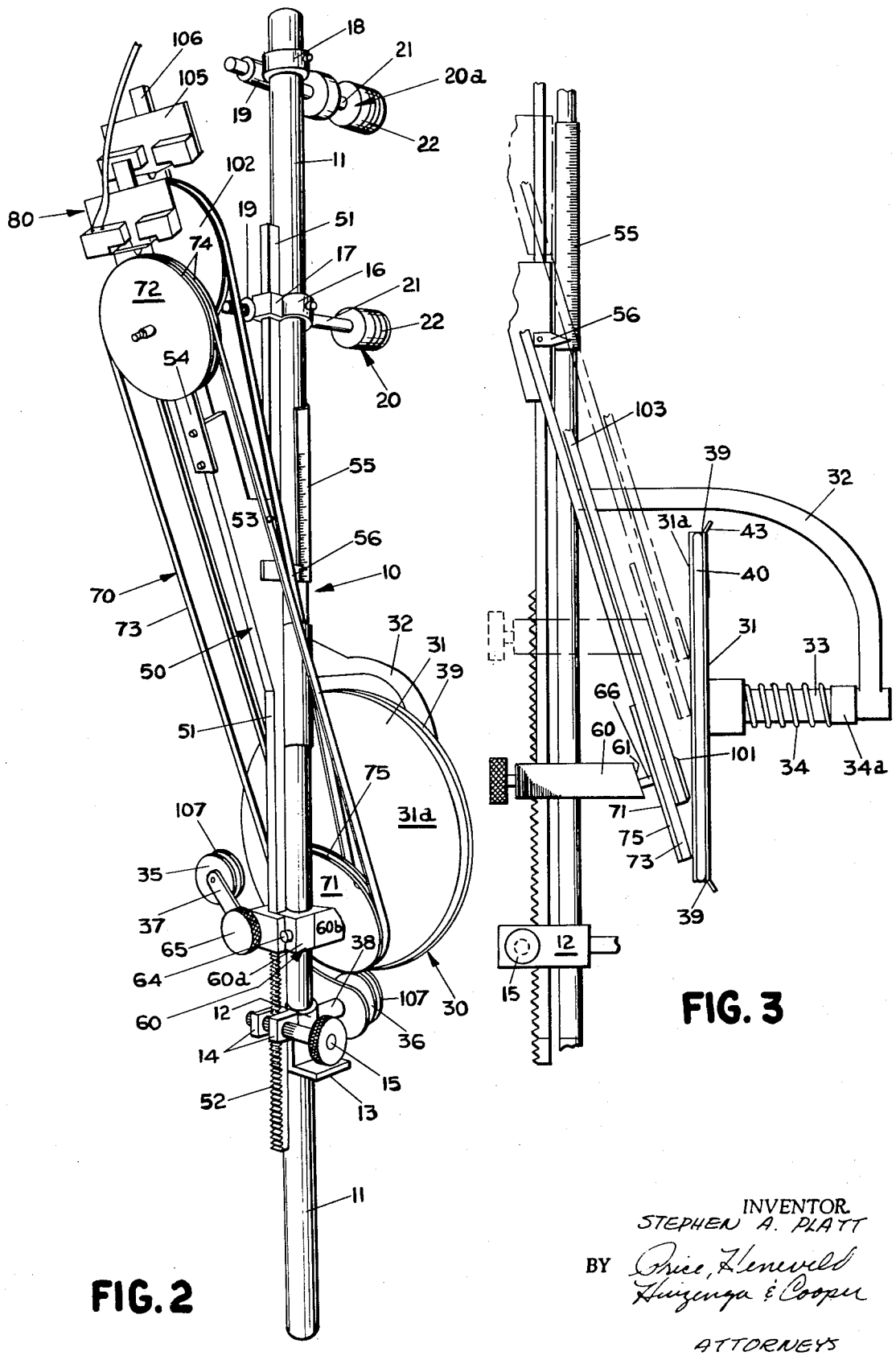

COILING WIRE METERING

BACKGROUND

This invention relates to a wire metering apparatus for use in conjunction with any machine requiring the repeated cutting of a wire strand into accurately measured lengths. It is particularly adapted to cutting electrical resistance wire to given lengths for wire coiling machines.

Resistance coils may vary in length from one-quarter of an inch to 12 feet. Usually, the resistance of such coils must be within one percent of specification. Thus, the length of wire which is wound must be very accurately determined and any stretching or mechanical deformation, other than coiling, of the wire must be minimized.

In the coiling operation, wire is fed to the coiling machine at very high speeds. The coiling spindle rotates at speeds as high as 1,200 to 5,000 revolutions per minute. To cut wire to accurate lengths when it is moving at such high speeds without causing deformation of the wire being coiled, a special cutting apparatus is required. The flying cutter, as it is known in the art, includes an index function and a cutting function. During the index function, the knife blade is set just slightly into the wire. The cutter then travels with the wire until the actual cutting is performed and completed. The time delay between indexing and cutting is very slight.

The activation of this cutting apparatus has previously been successfully accomplished with acceptable accuracy only by use of electronic eye mechanisms. In such systems, the wire passes through the coiling and cutting assembly until it comes to the electronic eye. When the light beam is broken, a timing sequences is initiated which activates the index and cut functions of the cutting assembly. To date, no effective mechanical metering apparatus has been provided for metering and cutting of the wire to appropriate lengths with accuracy equal to the electric eye system. The requirements exacted by the combination of high speed operation and extreme accuracy simply have been unattainable by existing mechanical apparatus.

This invention provides a mechanical metering apparatus which is extremely accurate even under extremely high speed operating conditions. The apparatus includes a metering wheel over which wire can be passed without slippage such that the wire drives and rotates the metering wheel. A driven belt member engages the side of the metering wheel such that the rotation of the metering wheel causes revolution of the driven belt member. Means are operably activated by the driven member for indicating the rate of revolution thereof and thereby provide an indication of the amount of wire which is passing over the metering wheel. Finally, means are provided for varying radially the position at which the driven member contacts the side of the metering wheel such that the ratio of the length of wire passing over the metering wheel to the rate of activation of the indicating means can be varied.

Thus, this invention provides an apparatus which can be used for metering any desired length of wire. It is also an object of this invention to facilitate repeated accuracy of measurement by providing a metering wheel in which positive, non-slipping contact is achieved between the wire and the wheel. In another aspect, means are provided for insuring that the wire passing over the wheel has, at all times, a constant radius with respect to the center of the wheel.

It is a further object of this invention to provide a switching assembly for flying cutter whereby the dwell time or time during which the cutter is fulfilling its index and cut functions can be varied independently of the rate at which wire is being coiled into the final product. This obviates the difficulties which would be encountered if the dwell time decreased with increased rates of operation and increased with decreased rates of operation.

An additional object of this invention is to provide a device which will not distort or otherwise vary the cross-sectional area of the wire, thus adversely affecting its electrical resistance values.

Finally, it is an object of this invention to provide a means whereby more than one wire can be metered by the same apparatus.

BRIEF DESCRIPTION OF THE DRAWINGS

These and other objects and advantages of this invention will be seen by reference to the written specification and appended drawings wherein:

FIG. 2 is a perspective view of the metering apparatus;

FIG. 3 is a fragmentary elevational view of the metering apparatus;

PREFERRED EMBODIMENT

Figure 1:
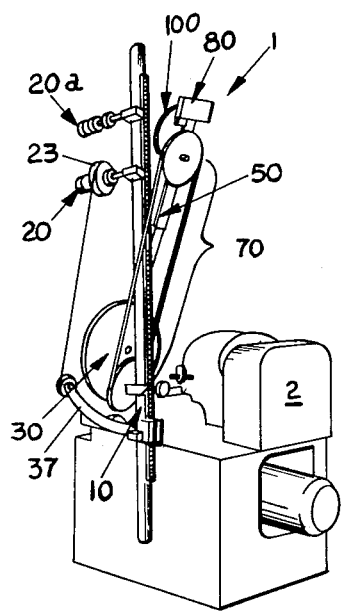
FIG. 1 is a perspective view of the wire metering apparatus mounted on a wire coiling and cutting assembly.

Referring to FIG. 1, it will be seen that the wire metering apparatus 1 includes a main support 10 which permits mounting the apparatus 1 adjacent the wire coiling and cutting machine 2 and also provides the prime support for remaining elements of the metering apparatus 1. Mounted on the support 10 are spool mounts 20 and a drive 30 which is driven by a strand of wire unwinding from a spool 23 on one of the spool mounts 20. A pulley mounting frame 50 is slidably mounted on the main support 10. Frame 50 supports revolving means or driven member 70 which is driven by the drive 30 and which activates the signal generators 80. Signal generator 80 acts as an indicator to indicate to the cutting apparatus of coiling and cutting machine 2, that a particular length of wire has passed through metering apparatus 1 and should be cut.

Support 10 includes a pole 11 which is preferably mounted to wire coiling and cutting apparatus 2 by means of a mounting flange 13 (FIG. 2). Flange 13 is integrally secured to and extends laterally from a sleeve 12 which is rigidly secured to pole 11 near its bottom.

Coiling and cutting apparatus 2 forms no part of this invention.

Frame 50 is slidably mounted on pole 11. It comprises strut 51, the bottom portion of which is equipped with teeth to form a rack 52 which engages pinion 15. Pinion 15 is rotatably mounted in parallel flanges 14 which are rigid extensions from fixed sleeve 12. The upper portion of strut 51 is slidably and non-rotatably received through sleeve 17. Sleeve 17 is integrally secured to sleeve 16 which in turn is rigidly secured to pole 11. To make strut 51 non-rotatable in sleeve 17, both are of a non-circular cross section preferably square.

Just above rack 52, strut 51 is rigidly secured to a split sleeve 60 which slides on pole 11. Referring to FIG. 2, it can be seen that split sleeve 60 comprises a back half 60a and a front half 60b which cooperate in a conventional manner to form a cylindrical opening therebetween such that split ring 60 can be slidably mounted on pole 11. The two halves 60a and 60b are held together by means of a bolt 64 and a locking knob 65. When knob 65 is tightened down, split ring 60 will not slide on pole 11. Conversely, loosening knob 65 allows split ring 60 to slide on pole 11. Strut 51 is rigidly secured to back half 60a. Thus, it can be seen that pulley mounting frame 50 can be moved by rotating pinion 15 only when locking knob 65 is loosened such that split ring 60 will slide on pole 11.

Revolving means or driven member 70 is mounted on frame 50 and is vertically movable therewith. Extending upwardly from inclined face 61 of split sleeve 60 is an axle 66 to which a first pulley 71 of revolving means 70 is rotatably mounted. A second pulley 72 is rotatably mounted on a flange 54 (FIg. 2) which is secured to an inclined support or post 53 which in turn inclines upwardly and outwardly from strut 51 and is integral therewith. First and second pulleys 71 and 72 are both disposed at an acute angle to pole 11 and are aligned with each other such that they carry a belt 73. It will be seen by reference to FIGS. 2, 5 and 6 that second pulley 72 is of conventional construction such that belt 73 is held in place by a pair of upwardly extending sides 74 as is conventional. In contrast, the groove or track on first pulley 71 has only one side 75 permitting variable engagement of the edge of belt 73 with drive 30 (see FIG. 3).

Belt 73 is driven around pulleys 71 and 72 by drive 30, or more specifically, by a driven or metering wheel 31 of drive 30. A hook-shaped bracket 32 is rigidly secured to pole 11 (FIG. 3) and includes an axle 33 which extends normal to and towards pole 11. Metering wheel 31 is rotatably mounted on the end of axle 33. A spring 34 surrounds axle 33 and extends between a collar 34a and wheel 31 such that wheel 31 is biased towards pole 11. That side of wheel 31 is disposed toward pole 11 provides a flat, continuous surface 31a which is engaged by belt 73 and acts as a drive surface therefor.

Figure 6:
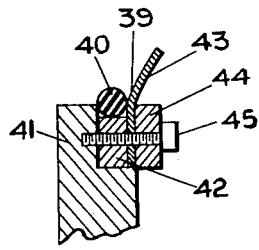
FIG. 6 is a fragmentary cross-sectional view of the circumference of the metering wheel.
Figure 8:
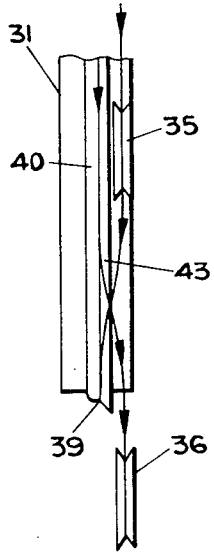
FIG. 8 is a fragmentary elevational view showing the relationship of the feed and take-off pulleys to the metering wheel.
Figure 7:
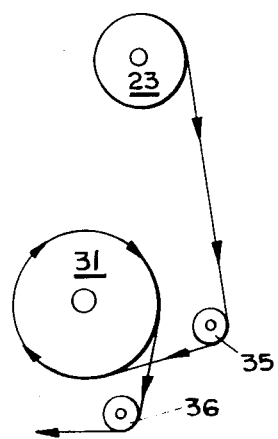
FIG. 7 is a schematic view showing the manner in which wire is passed over the metering wheel.

Metering wheel 31 includes a circumferential groove 39 which acts as a friction track to eliminate, within the precise tolerances permissible in coiled resistance wires, slippage between the wire or strand and wheel 31 (FIGS. 3, 6 and 8). The rotation of the wheel must accurately reflect the linear speed of the strand or wire in order for the cutting and coiling apparatus 2 to function accurately. It is formed by an O-ring 40 seated in a channel which is formed on one side by the upwardly extending edge 41 of wheel 31 (FIG. 7). The bottom of the channel is formed by a spacer 42. A polished steel flange 43 is held snugly against O-ring 40 by mounting ring 44 which is bolted in place by bolts 45 extending through flange 43, spacer ring 42 and into radially extending edge 41 of metering wheel 31. Thus, one side of groove 39 is formed by O-ring 40 and the second side is formed by flange 43. Both extend generally vertically upwardly from the center of groove 39 and then curve outwardly away from each other, thereby forming a wire trap between a low friction metal guide on one side and a high friction curvilinear surface on the other.

Wire is fed onto wheel 31 via a feed pulley 35 and is taken off wheel 31 via a take-off pulley 36 (FIG. 2). These are rotatably mounted on an arm 37 which in turn is rigidly mounted to a bracket 38. Bracket 38 is in turn rigidly secured to sleeve 12 on pole 11. Feed pulley 35 and idler pulley 36 are offset from the plane of the center of groove 39 in the direction of flange 43 (see FIG. 8). Mounted adjacent to pulleys 35 and 36, are a pair of identical pulleys 107 which serve to feed a second strand into winding and cutting apparatus 2 without passing it over metering wheel 31.

Wire is supplied from a spool of wire 23 (FIG. 1) which can be slipped over axle 21 (FIG. 2) of a spool mount 20. Disks 22 are provided for securing purposes. One such axle 21 extends laterally from sleeve 16 and a second axle 21 extends laterally from a sleeve 18 which is also rigidly secured to pole 11. Thus, wire is conveniently located on pole 11 and, if desired, two spools can be unwound simultaneously. However, only one strand will be used to drive metering wheel 31.

Figure 5:
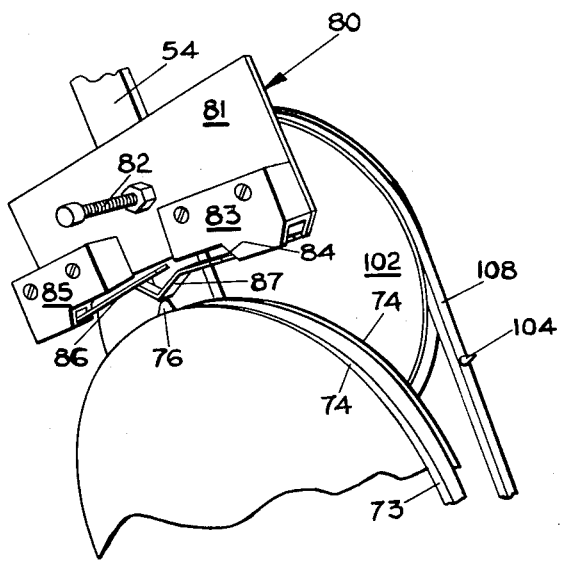
FIG. 5 is a fragmentary perspective view of the same portion of the apparatus a moment later.
Figure 4:
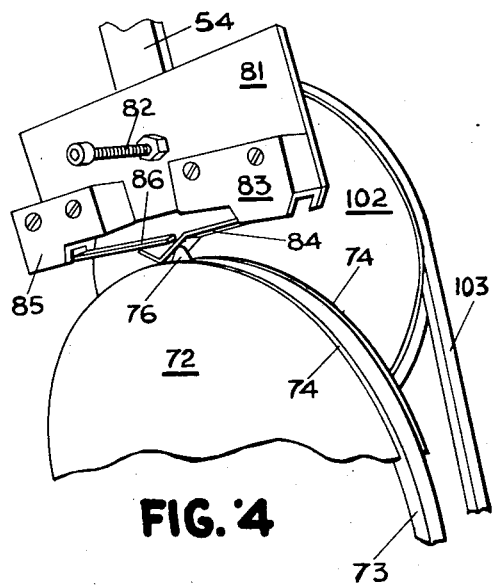
FIG. 4 is a fragmentary perspective view of a cam beginning to engage the switching assemblies.

As wheel 31 drives belt 73, belt 73 activates signal generator 80 by means of a plurality of cams or protrusions 76 extending upwardly from its surface (FIGS. 4 and 5). Signal generator 80 includes a mounting plate 81 which is secured to flange 54 by means of bolt 82 (FIGS. 4 and 5). A first switch 83 and a second switch 85 are mounted adjacent each other on mounting plate 81. A first lever 84 is pivotally connected to first switch 83 for activating same and a second lever 86 is similarly pivotally connected to second switch 85. First lever 84 includes a downwardly extending V-shaped protrusion or actuator contact near its end. The switches and levers are oriented such that second lever 86 engages the top of first lever 84. First lever 84 is thus engaged by a protrusion 76 and forced upwardly such that switch 83 is activated. In turn, lever 84 raises second lever 86 and switch 85 is activated a short time later. This provides a mechanical delay which could be replaced, if desired, by an electrical delaying circuit.

Mounted adjacent driven member 70 is an optional metering assembly 100 for cutting the wire at a different length without adjusting the position of metering wheel 31. It includes a sub-pulley 101 (FIG. 3) which is mounted coaxially with an driven by pulley 71. A second pulley 102 is then rotatably mounted on a bracket 106 which is rigidly secured to inclined post 53. A belt 103 passes over pulleys 101 and 102 and includes one or more cams or protrusions 104 extending upwardly from the surface thereof. Finally, an additional switch assembly 105 can be mounted on bracket 106, which is identical to switch assembly 80. In the alternative, assembly 80 can be relocated on bracket 106 when it is desired to cut wire in synchronization with the rotation of belt 103. Neither belt 103 nor sub-pulley 101 makes contact with the face of metering wheel 31. Because sub-pulley 101 is integrally secured to pulley 71, it will be rotated with pulley 71 in response to the engagement of belt 73 with the face 31a of metering wheel 31. By placing cams 104 in different relative locations on belt 103 one can activate the switches of assembly 105 at times different from the activation of the switches 83 and 85 in assembly 80. Accordingly, the wire can be cut into different lengths without adjusting metering wheel 31. For example, the geometry of assembly 100 might be such that wire would be cut at one-third the length.

OPERATION

The overall function of wire metering assembly 1 is to meter wire as it passes into coiling and cutting assembly 2 such that the wire can be cut to lengths of very precise dimensions. Wire is unwound from a spool 23, over feed pulley 35, onto metering wheel 31 and then around take-off pulley 36 (FIG. 8). From thence it is pulled into the wire coiling and cutting apparatus 2. Referring to FIG. 8, it will be seen that feed pulley 35 is slightly offset from the plane of the center of groove 39 on the same side thereof as flange 43. Thus, as wire feeds from feed pulley 35 onto wheel 31, it will slide over polished steel flange 43 and down into the center of groove 39 where it will wedge between the flange 43 and O-ring 40. O-ring 40 provides a gripping surface insuring a positive grip between the wire and metering wheel 31 such that all slippage therebetween, significant even to very precise measurement, is eliminated.

The fact that feed pulley 35 is offset in the manner described above, causes the wire to slide over polished steel flange 43. This action tends, first of all, to straighten out any bends or irregularities in the wire. This insures total contact between the wire and O-ring 40 and insures that the length of wire taken up by metering wheel 31 is always constant. Secondly, the fact that wire first contacts polished steel flange 43 insures that it will always slide into the center of groove 39. This too insures that the length of wire taken up by metering wheel 31 will always be constant. If it were not, the length of wire cut by the cutting assembly would not be constant, destroying the accuracy of the machine and, thus, one of its primary objectives. Thus, it is important that the radius of the wire passing over wheel 31 remains constant.

The rotation of metering wheel 31 drives belt 73 about pulleys 71 and 72. It will be noted that pulley 71 is mounted at an acute angle with respect to the surface of metering wheel 31. This causes belt 73 to contact side 31a of wheel 31 through an arc, rather than merely at a point. By thus increasing the area of contact between the two members, any slippage therebetween is minimized. It has been found that an acute angle of about 20° degrees is preferable since this insures an arc of contact of approximately 1 to 1 ½ inches, but is not so small an angle as would create excessive friction between belt 73 and wheel 31. Slippage between revolving belt 73 and wheel 31 is further minimized by spring 34. Referring to FIG. 3, it can be seen that spring 34 provides a constant bias on the wheel 31, forcing it towards engagement with belt 73.

Belt 73 carries one or more cams or protrusions 74. As one of these passes over pulley 72, it engages V-shaped protrusion 87 of first lever 84 and pushes it upwardly. FIG. 5 shows a cam 76 just as it begins to contact first lever 84. In FIG. 6, cam 76 has moved slightly to the left and has pushed lever 84 upwardly to its maximum height. As first lever 84 is moved upwardly, it activates switch 83. This, in turn, activates the indexing function of the flying cutter of coiling and cutting assembly 2. As first lever 84 is pushed upwardly, it, in turn, pushes second lever 86 upwardly and eventually, switch 85 is activated. This in turn activates the cutting function of the flying cutter and the cutting blade severs the wire. As cam 76 passes, first lever 84 and second lever 86 return downwardly and switches 83 and 85 are deactivated. Upon completion of the cutting function, the blade returns to its original position.

First and second switches 83 and 85 and their respective levers 84 and 86 are oriented such that there is a slight delay, following the activation of first switch 83, before second switch 85 is activated. This insures that the cutting assembly will be traveling with and at the same speed as the wire when the knife blade severs it. If is were not, the accuracy of the system would be destroyed and the coils being wound could very well be ruined. By changing slightly the spacial relation of the first and second switches to each other, the duration of this delay can be varied.

The entire signal generator 80 can be moved either upwardly or downwardly with respect to pulley 72 by merely loosening bolt 82 and sliding plate 81 either upwardly or downwardly. The aperture in flange 54 is in the shape of a slot (not shown) such that this motion can be accomplished. This motion is important since it allows variation of the dwell time of the cutting apparatus, i.e., the length of time between the initiation of the flying cutter's indexing function and its cutting function. If these adjustments were not incorporated, the dwell time of the cutter would be solely a function of the velocity of metering apparatus 1, or in other words a function of the rate of production of coils. As the rate of production were increased, the dwell time of the cutting assembly would be shortened since cam 76 would move much more rapidly into and out of engagement with first lever 84. A point could be reached at which the activation of switches 83 and 85 would be far too rapid for the mechanics of the flying cutter to keep up. Accordingly, the overall system would fail. On the other hand, if the rate of production were decreased, the dwell time of the flying cutter would be substantially increased since cam 76 would remain in contact with first lever 84 for a much longer period of time. Unfortunately, there are practical limits to the distance the flying cutter can travel with the wire as it is moved through the coiling apparatus. Thus, the flying cutter under circumstances of excessive dwell time could create undesirable tension on delicate coils being wound, and thereby impair or destroy their usefulness.

Accordingly, when the wire metering apparatus is being operated at high speeds, i.e., for high rates of production, mounting plate 81 can be adjusted downwardly such that cam 76 has a longer period of engagement with lever 84. This increases the dwell time of the flying cutter with respect to the rate of operation of metering apparatus 1. Similarly, when metering apparatus 1 is operated at lower speeds, i.e., lower rates of production, plate 81 can be moved away from pulley 72, decreasing the dwell time of the flying cutter with respect to the rate of operation of apparatus 1. As described above, this is readily accomplished by loosening bolt 82, sliding plate 81 in the direction desired and retightening bolt 82.

When frame 50 is in a given location with respect to first mounting assembly 10, belt 73 will contact the side 31a of metering wheel 31 at a particular radius. Accordingly, the linear velocity of belt 73 will be a function of the linear velocity of the wire being pulled over metering wheel 31. Regardless of that velocity, the length of the section of wire cut by the flying cutter in response to the activation of switches 83 and 85 will always be the same.

If it is desired to vary the length of wire being cut, one merely rotates knob 65 outwardly thereby loosening split ring 60, and then rotates pinion 15 such that frame 50 moves either upwardly or downwardly as may be desired. Pole 11 provides a track on which frame 50 slides. Because pole 11 is parallel to the flat side 31a of wheel 31, belt 73 will always be in contact with side 31a regardless of the relative position of frame 50 on pole 11, within the radial limits of metering wheel 31. When second mounting assembly 50 is in the desired location, knob 65 is retightened, locking the position of assembly 50.

If the radius of the point of contact between belt 71 and the side of wheel 31 is increased, it is apparent that the linear velocity of belt 73 will be increased with respect to the rate of rotation of wheel 31. Accordingly, switches 83 and 85 will be activated more frequently and the amount of wire being cut will be shorter. Similarly, if frame 50 is moved such that the point of engagement between belt 73 and metering wheel 31 moves farther away from the center of wheel 31, the length of wire being cut will be decreased. A scale 55 is fixed to pole 11 and can be graduated in units of length (FIG. 2). A pointer 56 is fixed to strut 51 such that it aligns with scale 55. Thus, the position of pointer 56 with respect to scale 55 will indicate the length of wire which will be cut when assembly 50 is in that particular position.

In the alternative, the length of wire being cut can be varied by operably connecting switching assembly 105 to cutting apparatus 2 such that it is activated when cams 104 on belt 103 activate switching assembly 105. In the preferred embodiment, cams 104 are arranged on belt 103 such that making this adjustment, without adjusting metering wheel 31, will give wire whose length is a convenient fraction or whole number multiple of the length which would be obtained using switch 80 and belt 73. Thus, the switch to switching assembly 105, or the transfer of switch 80 to a position over belt 103, might result in wire lengths one-third the length previously obtained.

Where more than one wire is to be fed into the coiling and cutting assembly 2, a second wire can be fed over the pair of pulleys 107 from a second spool of wire mounted on the second spool mount 20a. This wire would be fed under both pulleys 107 without being passed over metering wheel 31. By providing a third set of similar pulleys 107, a third wire could be fed to the winding and cutting apparatus 2.

It will be appreciated that the above is merely a preferred embodiment of the invention and that many alterations and modifications can be made thereof without departing from its spirit or broader aspects.

The embodiments of the invention in which an exclusive property or privilege is claimed are defined as follows:

1. A metering apparatus for a continuous strand being pulled therethrough comprising: a rotatably mounted wheel driven by the movement of the strand; the side of said wheel having a flat surface; a rotatably driven member frictionally engaging said flat surface at an acute angle thereto, said rotatably driven member being circularly shaped at the point of contact with said flat surface such that slippage between said rotatably driven member and said wheel is thereby minimized; a metering device associated with said rotatably driven member, said metering device and said rotatably driven member including means cooperating to activate said metering device in constant proportion to the rate of rotation of said rotatably driven member, said metering device thereby providing an indication of the length of strand passing over said wheel; means for varying radially the position at which said driven member engages said flat surface of said side of said wheel whereby the ratio of the amount of said continuous strand passing over said wheel to the rate of activation of said metering device can be varied.

2. The apparatus of claim 1 in which said acute angle is approximately 20°.

3. The apparatus of claim 1 in which means are provided constantly urging said wheel and said rotatably driven member into engagement such that slippage therebetween is minimized.

4. The apparatus of claim 1 in which said driven member comprises: first and second pulleys and an endless flexible member passing over said pulleys; said first pulley having a generally one-sided track about its circumference such that a portion of said flexible member is exposed as it passes over said first pulley; said first pulley being disposed adjacent said wheel surface such that said exposed portion of said flexible member engages said side of said wheel and is revolved about said pulleys by rotation of said wheel.

5. The apparatus of claim 4 in which: said wheel is mounted on a support having a track element paralleling said flat side surface of said wheel; said pulleys being mounted on a frame; said track element having means for varying radially the position at which said flexible member contacts said side of said wheel.

6. The apparatus of claim 5 in which said support includes biasing means urging said wheel into engagement with said driven member.

7. The apparatus of claim 1 in which includes: a circumferential groove in said wheel in which said strand is seated as it passes over said wheel; one side of said groove being formed by a gripping surface slanting radially and outwardly from the center of said groove; the other side of said groove being formed by a second surface slanting inwardly towards said gripping surface such that said wire is forced into engagement with said gripping surface, thereby minimizing slippage between said passing strand and said wheel.

8. The apparatus of claim 7 in which said gripping surface extends generally vertically upwardly from the center of said groove and curves outwardly therefrom; and in which said second surface extends generally vertically upwardly from said center of said groove and curves outwardly therefrom.

9. The apparatus of claim 8 in which said gripping surface comprises a rubber O-ring seated on the circumference of said wheel and said second surface comprises a smooth surfaced steel flange secured tightly against said O-ring on the circumference of said wheel.

10. The apparatus of claim 8 in which: a feed pulley is positioned adjacent the circumference of said wheel such that a continuous strand can be passed over said feed pulley and onto said wheel; said feed pulley being positioned such that it is slightly offset from the plane of the center of said groove in the direction of said second surface such that said strand passes over said second surface as it feeds from said feed pulley into engagement with said gripping surface.

11. The apparatus of claim 4 which includes: a circumferential groove in said wheel in which said strand is seated as it passes over said wheel; one side of said groove being formed by a gripping surface slanting upwardly and outwardly from the center of said groove; the other side of said groove being formed by a second surface slanting inwardly towards said gripping surface such that said wire is forced into engagement with said gripping surface, thereby minimizing slippage between said passing strand and said wheel.

* * * * *